United States Patent [19]
Bhattacharya et al.

[11] Patent Number: 5,513,090
[45] Date of Patent: Apr. 30, 1996

[54] HYBRID SERIES ACTIVE, PARALLEL PASSIVE, POWER LINE CONDITIONER FOR HARMONIC ISOLATION BETWEEN A SUPPLY AND A LOAD

[75] Inventors: Subhashish Bhattacharya; Deepakraj M. Divan, both of Madison, Wis.

[73] Assignee: Electric Power Research Institute, Inc., Palo Alto, Calif.

[21] Appl. No.: 340,152

[22] Filed: Nov. 15, 1994

[51] Int. Cl.⁶ .............................. H02M 1/12; H02J 1/02
[52] U.S. Cl. ................... 363/40; 363/39; 307/105
[58] Field of Search ............................ 363/35, 37, 39, 363/40, 43; 323/207, 208, 209; 307/105

[56] References Cited

U.S. PATENT DOCUMENTS

| | | | |
|---|---|---|---|
| 4,651,265 | 3/1987 | Stacey et al. | 363/35 |
| 5,198,746 | 3/1993 | Gyugyi et al. | 363/39 |
| 5,351,181 | 9/1994 | Brennen et al. | 363/40 |
| 5,355,025 | 10/1994 | Moran et al. | 363/39 |
| 5,355,295 | 10/1994 | Brennen | 363/40 |
| 5,359,275 | 10/1994 | Edwards | 363/40 |
| 5,384,696 | 1/1995 | Moran et al. | 363/40 |

OTHER PUBLICATIONS

Bhattacharya, et al. Serial No. 08/079,303 filed Jun. 18, 1993.

*Primary Examiner*—Matthew V. Nguyen
*Attorney, Agent, or Firm*—Flehr, Hohbach, Test, Albritton & Herbert

[57] ABSTRACT

The apparatus includes an active filter, coupled in series, and a passive filter, coupled in parallel, to a power distribution network. The power distribution network includes a voltage source that induces input currents at a first end of the power distribution network. Nonlinear loads and other conditions on the power distribution network cause unbalanced power signals. The active filter controller of the invention uses synchronous transformations on the input currents to identify a negative sequence fundamental signal and a positive sequence fundamental signal, while filtering all harmonic components within the input currents. The negative sequence fundamental signal and the positive sequence fundamental signal are combined to form an active filter reference signal which is applied to the active filter. In response to the active filter reference signal, the active filter operates as a current controlled harmonic voltage source, carrying only the fundamental current, while only injecting harmonic voltages. Consequently, the active filter is operated as a harmonic isolator between the supply and load.

7 Claims, 9 Drawing Sheets

$$F_q = F_a$$
$$F_d = \frac{-1}{\sqrt{3}}F_a - \frac{2}{\sqrt{3}}F_b$$

$$\left|\begin{array}{c}F_q \\ F_d\end{array}\right| = \left|\begin{array}{cc}\cos\theta & -\sin\theta \\ \sin\theta & \cos\theta\end{array}\right| \left|\begin{array}{c}F_qs \\ F_ds\end{array}\right|$$

VECTOR ROTATION EQUATIONS $$\hat{F}_{qd} = \varepsilon^{-j\theta} \hat{F}^s$$

WHERE $\hat{F}_{qd} = F_q - jF_d$ $\hat{F}^s_{qd} = F^s_q - jF^s_d$

*FIG. 3*
(PRIOR ART)

$$\begin{vmatrix} F_q^s \\ F_d^s \end{vmatrix} = \begin{vmatrix} \cos\theta & \sin\theta \\ -\sin\theta & \cos\theta \end{vmatrix} \begin{vmatrix} F_q \\ F_d \end{vmatrix}$$

$F_a = F_q$
$F_b = -\frac{1}{2}F_q - \frac{\sqrt{3}}{2}F_d$
$F_c = -F_a - F_b$

VECTOR ROTATION $\hat{F}^s_{qd} = \varepsilon^{j\theta} \hat{F}_{qd}$

WHERE $\hat{F}_{qd} = F_q - jF_d$ $\hat{F}^s_{qd} = F^s_q - jF^s_d$

HYBRID SERIES ACTIVE, PARALLEL PASSIVE, POWER LINE CONDITIONER FOR HARMONIC ISOLATION BETWEEN A SUPPLY AND A LOAD

BRIEF DESCRIPTION OF THE INVENTION

This invention relates generally to a power conditioning apparatus and method which operates in the presence of unbalanced load, passive filter and source conditions. This invention more particularly relates to a hybrid series active and parallel passive filter system wherein a controller for the hybrid series active filter detects supply current unbalance and in response thereto, generates reference signals that are applied to the hybrid series active filter in order to isolate the filter from the unbalanced conditions and simultaneously provide harmonic isolation between a power supply and a load using a small rated series active filter.

BACKGROUND OF THE INVENTION

Power electronic circuits are used to control and condition electric power. For instance, power electronic circuits may be used to convert a direct current into an alternating current, to change voltage or current magnitude, or to change the frequency of an alternating current.

An inverter is a power electronic circuit which receives a dc source signal and converts it into an ac output signal. Harmonic neutralization and pulse-width modulation techniques are used to generate the ac signal. Harmonic neutralization involves a combination of several phase-shifted square-wave inverters, each switching at the fundamental frequency. Pulse-width modulation involves switching a single inverter at a frequency several times higher than the fundamental.

A growing number of nonlinear loads in the electric utility power network has resulted in increasing waveform distortion of both voltages and currents in ac power distribution systems. Typical nonlinear loads are computer controlled data processing equipment, numerical controlled machines, variable speed motor drives, robotics, medical and communication equipment.

Utilities provide sinusoidal supply voltages. Nonlinear loads draw square wave or pulse-like discontinuous currents instead of the purely sinusoidal currents drawn by conventional linear loads. As a result, nonlinear current flows through the predominantly inductive source impedance of the electric supply network. Consequently, a non-linear load causes load current harmonics and reactive power to flow back into the power source. This results in unacceptable voltage harmonics and supply load interaction in the electric power distribution network.

The degree of current or voltage distortion can be expressed in terms of the magnitudes of harmonics in the waveforms relative to the fundamental magnitude. Total Harmonic Distortion (THD) is one of the accepted standards for measuring voltage or current quality in the electric power industry.

Apart from voltage and current distortion, another related problem may arise when nonlinear loads are connected to the electric power network. Unbalance in a nonlinear load results in unbalanced load currents. Specifically, the load currents have unbalanced fundamental and harmonic components. In addition, the load currents have unbalanced magnitude and phase values. Unbalance in an electric power network also exists for linear loads. This is a common phenomena in the distribution power supply networks due to the presence of single phase loads. Unbalance in the supply current causes unbalanced voltages across a series active filter. The operation of the series active filter should not be influenced by the unbalanced supply currents and the unbalanced voltages across the series active filter. Hence, it is desirable to isolate a series active filter from both the unbalanced supply currents (flowing through the series active filter) and the unbalanced voltages across the series active filter. Isolation of the series active filter from distribution system is required to ensure a small rated series active filter.

Certain types of electrical loads, such as synchronous and induction motors, require balanced three phase voltages. Small voltage unbalance in such devices can result in significantly larger current unbalance, resulting in an overcurrent stator winding condition, excessive stator winding temperature, excessive motor noise, and higher motor core losses. Thus, motor lifetime and reliability are adversely affected.

Aside from causing problems with load devices, unbalanced load currents result in unbalanced supply currents. This phenomenon produces unbalanced shunt passive filter terminal voltages. This will result in unbalanced passive filter currents, even if the passive filter impedances are balanced and all the phases have equal quality factors. Further unbalance may result from passive filter L and C component tolerances and unequal quality factors of the tuned passive LC filters. This results in unbalanced passive filter current even with balanced supply and load currents and initial balanced passive filter terminals, and therefore further unbalance of the passive filter terminal voltage. Still further unbalance may arise from unbalanced supply currents caused by unbalanced source voltages or unbalanced source impedances.

In general, any unbalanced or unsymmetrical quantity, in steady state, can be decomposed into a set of balanced or symmetrical three phase positive sequence components, a set of balanced or symmetrical three phase negative sequence components, and a set of balanced or symmetrical zero sequence components.

A number of techniques have been used to provide power line conditioning to address some of the foregoing problematic conditions. Passive filters, such as LC tuned filters, are often used because they are efficient and inexpensive. On the other hand, there are a number of problems associated with passive filters. Active power filters have been developed to resolve some of the problems associated with passive filters. Active power filters, or active power line conditioners (APLCs), inject signals into an ac system to cancel harmonics.

Active filters comprise one or two pulse width modulated inverters in a series, parallel, or series-parallel configuration (with respect to the load or supply). The inverters have a dc link, which can be a dc inductor (current link) or a dc capacitor (voltage link). It is necessary to keep the energy stored in the dc link (capacitor voltage or inductor current) at an essentially constant value. The voltage on the dc link capacitor can be regulated by injecting a small amount of real power into the dc link. The injected real power compensates for the switching and conduction losses inside the APLC.

One problem associated with active filters is that it is expensive to manufacture an active filter with a large VA rating. Thus, it is highly desirable to reduce the required VA rating for an active filter. A commercially practical active filter VA rating should be less than 5% of the load VA rating. An active filter with a low VA rating cannot supply or absorb any significant load fundamental VA. Load fundamental VA absorbed by an inverter may saturate the inverter current controller. Another problem with absorbing load fundamental VA is that the absorbed power consumes a substantial portion of the inverter VA rating. Consequently, the inverter is not able to act as a harmonic isolator between the load and the supply.

The use of hybrid passive-active filters has been proposed as a means for combining the lower cost of passive filters with the control capability offered by a small rating series active filter. In such a system, the passive filter absorbs all harmonic currents generated by the load with the series active filter operating, while the small series active filter provides harmonic isolation between the load and the power source (utility company). The series active filter is controlled to force all load harmonics into the passive filter, thereby achieving harmonic isolation between the load and the supply. This forces purely sinusoidal current in the ac line. All harmonic currents, are in principle, diverted to the passive filter which provides a low impedance path for the dominant harmonics which are usually the low frequency harmonics such as the 5th and 7th. The passive filter can be tuned to each of the dominant harmonics and for high frequency harmonics.

Figure 1:
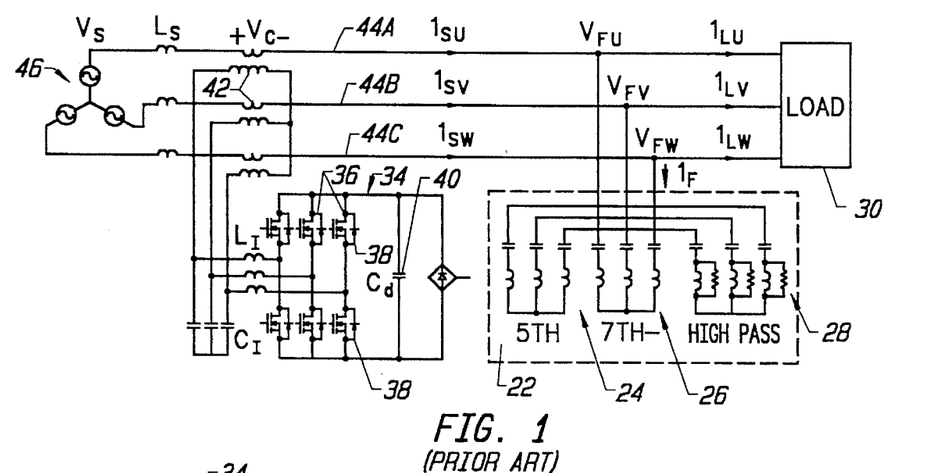
FIG. 1 depicts a hybrid series active-parallel passive power line conditioner in accordance with the prior art.

A combined system with a shunt passive filter and a small rated series active filter is illustrated in FIG. 1. The system 20 includes a shunt passive LC filter 22 with a 5th tuned LC filter 24, a 7th tuned LC filter 26, and a high pass filter 28 connected in parallel with the load 30. A small rated series active filter may be realized with a three-phase inverter 34, such as a resonant dc link voltage source inverter. The inverter 34 uses six Insulated Gate Bipolar Transistors 36 with six feedback diodes 38. Naturally, other switching devices with intrinsic turn-off capabilities may be used. A dc capacitor 40 is used as a dc link voltage source. Transformers 42 are used to realize a serial coupling to the three-phase power lines 44A, 44B, and 44C which are energized by power supply 46.

Figure 2A:
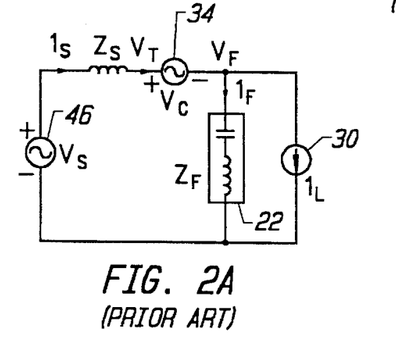
FIGS. 2(a) through 2(c) depict electrically equivalent circuits corresponding to the system of FIG. 1.

Assuming that the series active filter realized by the voltage source inverter has large bandwidth and therefore behaves as an ideal controllable voltage source, a single phase equivalent circuit for the system of FIG. 1 is shown in FIG. 2(a). In FIG. 2(a), $Z_f$ is the impedance of the shunt passive filter system 22 and $Z_s$ is the source impedance. The harmonic producing load 30 acts like a current source. The control strategy is to modulate the series active filter 34 so as to ideally present a zero impedance at the fundamental frequency and infinite pure resistance at all the load current harmonic frequencies. In such a case, the load current harmonics are constrained to flow in the shunt passive filter, and the worst case harmonic voltage across the series active filter 34 is given by the arithmetic sum of the supply voltage harmonics, if present, and the shunt passive filter terminal voltage harmonics. The series active filter 34 is controlled to act as an active impedance, which differs from the conventional series or shunt active filters that are respectively controlled to act as a voltage source (zero impedance) or current source (infinite impedance).

Figure 2B:
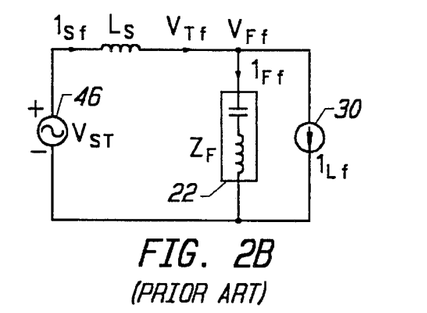
Figure 2C:
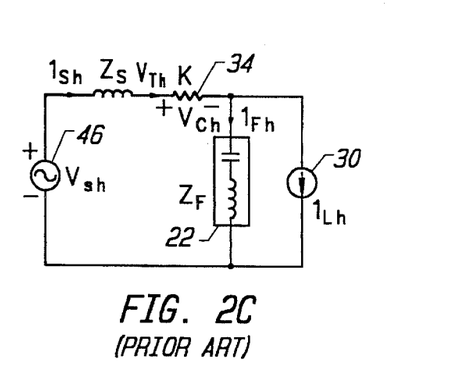

FIGS. 2(b) and 2(c) show the equivalent circuit of FIG. 2(a) for the fundamental and the harmonics respectively, assuming zero impedance at the fundamental and a finite maximum resistance K (ohms) at all the harmonic frequencies of the load. It can be seen from FIG. 2(b) that no fundamental frequency voltage is applied to the inverter, and the shunt passive filter only acts as a power factor improvement capacitor of the load for the fundamental. This implies that the KVAR rating of the shunt passive filter can be designed so as to achieve a unity displacement factor for the load. This design criteria, however, will have an affect on the passive filter terminal voltage THD, so suitable optimization may be necessary.

From FIG. 2(c), one may derive the following equations:

$$I_{sh} = \frac{Z_f^* I_{LH}}{Z_s + Z_f + K} + \frac{V_{sh}}{Z_s + Z_f + K} \tag{1}$$

$$V_{fh} = Z_f I_{fh} = -\frac{(Z_s + K) Z_f I_{Lh}}{Z_s + Z_f + K} + \frac{Z_f V_{sh}}{Z_s + Z_f + K} \tag{2}$$

$$V_c = V_{ch} = \frac{K Z_f I_{Lh}}{Z_s + Z_f + K} + \frac{K V_{sh}}{Z_s + Z_f + K} \tag{3}$$

Equations 1–3 indicate that if the series active filter 34 can be controlled such that $K \gg Z_f$, then the load current harmonics are constrained to flow into the shunt passive filter, instead of flowing back into the source. From FIG. 2(c), it can be seen that if the series active filter can be controlled such that the resistance K is much larger than the source impedance, $Z_s$, then the source impedance will have no effect on the compensation characteristics of the shunt passive filter 22. Also, no ambient harmonics generated elsewhere in the system can flow into the shunt passive filter and hence the possibility of resonance condition between the source 46 and the shunt passive filter 22 is eliminated. Similarly, since no load current harmonics can flow into the source 46 or to other passive filters elsewhere in the system, the possibility of resonance condition between the load 30 and the source 46 (beyond the point of common coupling) is also eliminated. The series active filter 34 acts like a damping resistance to harmonics, which solves the problems associated with using only a shunt passive filter, such as anti-resonance and harmonic sinks to the power system. The series active filter 34 acts as a current controlled harmonic voltage source and does not inject any fundamental voltage. Hence, it does not effect the fundamental supply current which is dictated by the load and the fundamental KVAR of the passive filter system.

The equations also indicate that if the series active filter 34 can be controlled such that $K \gg Z_s$ and $K \gg F_v$, then the harmonic voltages of the source $V_{sh}$, applies only to the series active filter 34 and not to the shunt passive filter 22 terminal voltage Vf. In this case, harmonic voltages applied to the series active filter 34 are given by the vector sum of harmonic voltages generated by the load current harmonics flowing into the shunt passive filter, $Z_f I_{Lh}$, and the harmonic voltages of the source $V_{sh}$. This is characterized by the following equation:

$$V_{ch} = -Z_f I_{Lh} + V_{sh} \tag{4}$$

The first term on the right hand side of equation (4) relates to the harmonic impedance of the shunt passive filter and depends on the quality factor Q, of the shunt passive filter. The larger the value of Q, the smaller is the required VA rating of the series active filter. The second term on the right hand side of the equation depends on the harmonic voltage of the supply, $V_{sh}$, which does not appear at the shunt passive filter terminal but is applied across the series active filter. In such a case the series active filter isolates the load current harmonics from the power system and the power system's harmonics from the load, and the series active filter acts as a "harmonic isolator". Due to the "harmonic isolator" action of the series active filter 34, the shunt passive filter 22 can be designed independent of the source impedance. This is a significant advantage because the filter system can be designed independent of the source impedance. Further, the shunt passive filter can be tuned to particular harmonic frequencies of the load current. Hence, the series active filter increases the effectiveness of the shunt passive filter.

If the series active filter can achieve a value of K sufficiently larger than the source impedance, $Z_s$, and the shunt passive filter impedance, $Z_f$, for all load current harmonic frequencies, then the series active filter can achieve good harmonic isolation between the source and the load. The features and performance of the combined system of series active filter 34 and shunt passive filter 22 are greatly influenced by the filtering algorithm employed for the extraction of source current harmonics and the control scheme for the series active filter 34.

A synchronous reference frame regulator may be used to implement the described control strategy for the series active filter 34. The operation of the series active filter 34 is governed by a pulse-width modulator or a discrete pulse modulator which toggles the gates of the IGBTs 36 (or other active devices used in the filter) in a predetermined fashion.

Synchronous reference frame regulators have been widely used for controlling ac machines. In general, ac machine control theory is directed toward providing accurate mechanisms for controlling the torque of a machine. Torque control in an ac machine is obtained by managing a current vector composing amplitude and phase terms. The control of ac machines is complicated by the requirement of external control of the field flux and armature mmf spatial orientation. In the absence of such a control mechanism, the space angles between the various fields in an ac machine vary with load and result in oscillations or other unfavorable physical phenomenon. Control systems for ac machines which directly control the field flux and armature mmf spatial orientation are commonly referred to as "field orientation" or "angle" controllers. Such controllers employ synchronous transformations, as will be described below.

The fundamental principles of field orientation control of ac motors is described in Introduction to Field Orientation and High Performance AC Drives, IEEE Industrial Drives Committee of the IEEE Industry Applications Society, Oct. 6–7, 1986. Field orientation principles rely upon the fact that the rotor of a motor has two axes of magnetic symmetry. One axis is known as the direct axis, and the other axis is known as the quadrature axis. These terms are usually shortened to simply refer to the d-axis and the q-axis.

Figure 3:
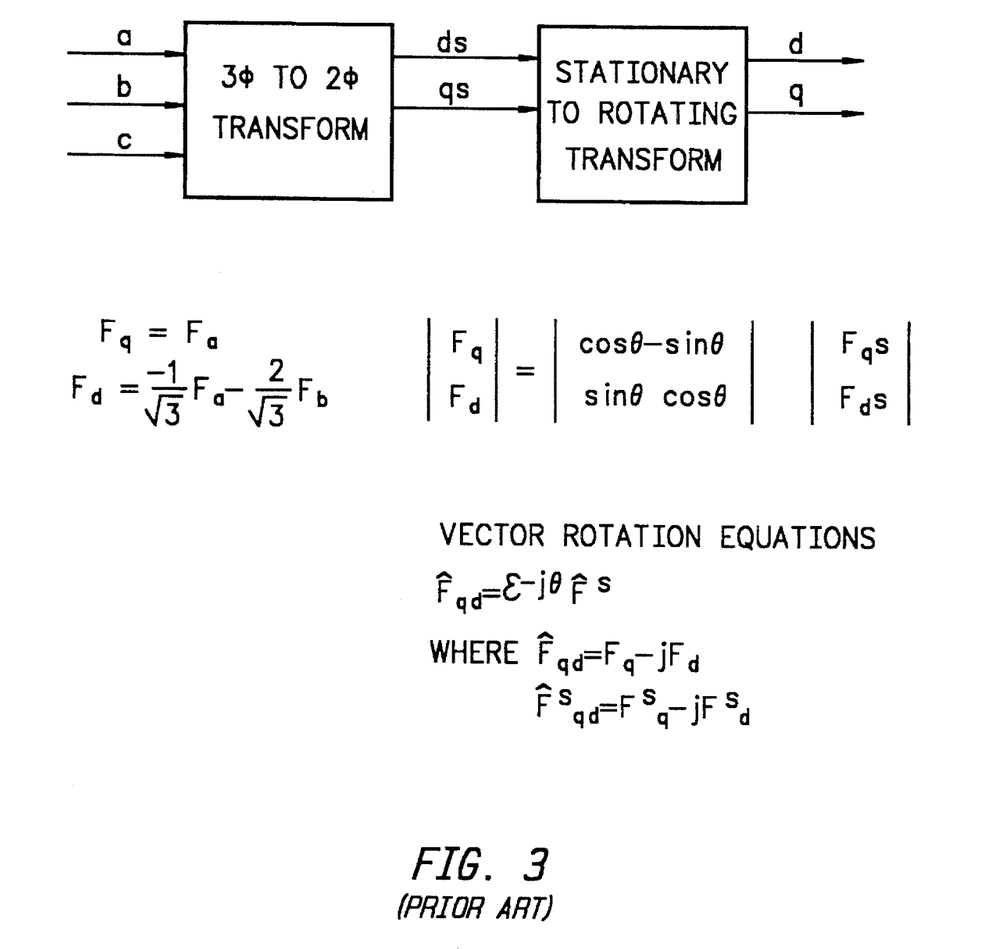
FIG. 3 depicts a field orientation control system and its corresponding mathematical model.

Field orientation techniques endeavor to control the phase of the stator current to maintain the same orientation of the stator mmf vector relative to the field winding in the d-axis within the d-q scheme. FIG. 3 depicts a symbolic representation of a field orientation control system and its corresponding mathematical model. The three phase system (a, b, c) is first synchronously transformed to a two phase ds-qs scheme which is stationary with respect to the three phase system. This 3-phase to 2-phase transformation is equivalent to a set of linear equations with constant coefficients, as shown in FIG. 3.

The second step is the synchronous transformation from stationary d-q variables to rotating d-q variables. This transformation involves the angle Θ between the two systems and is described by the matrices given in the figure. The rotation transformation is often referred to as a "vector rotation" since the d-q quantities can be combined as a vector and the transformation then amounts to the rotation of one vector with respect to the other. FIG. 3 includes the vector rotation equations.

Figure 4:
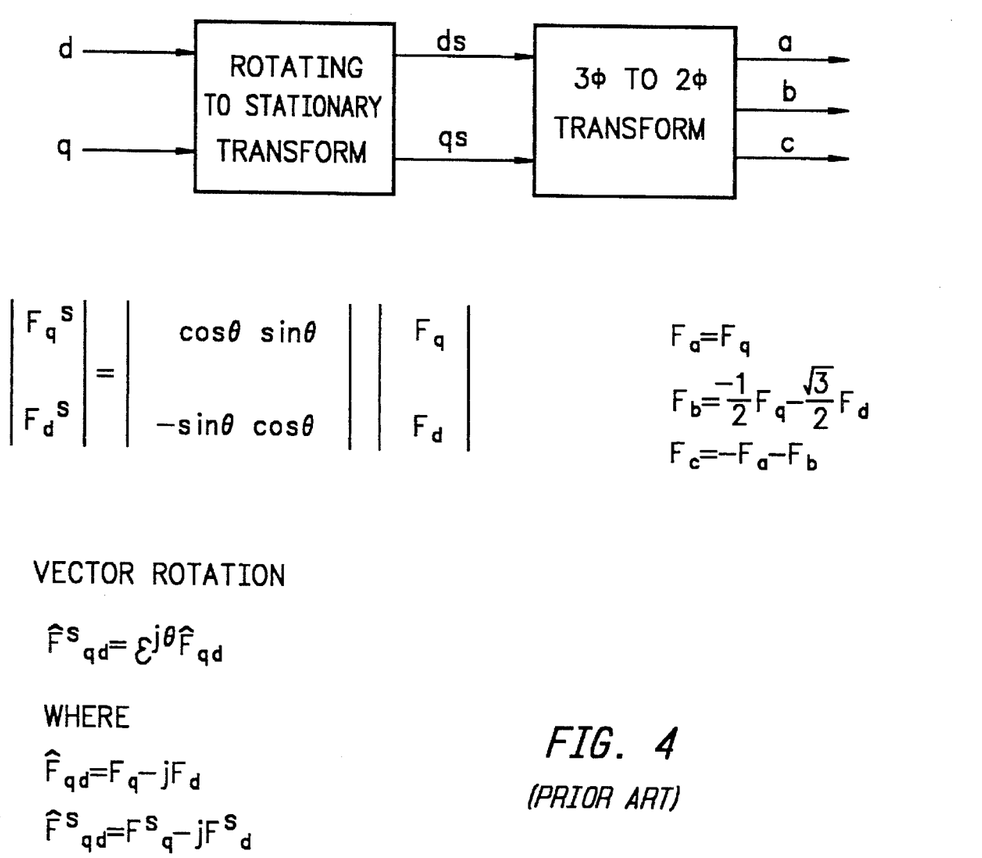
FIG. 4 represents a field orientation control system and its corresponding mathematical model.

FIG. 4 depicts the inverse synchronous transformations to those performed in FIG. 3. Initially, a rotating-to-stationary synchronous transformation is made using the matrices depicted in FIG. 4. After the stationary rotor reference frame variables are established, a two phase to three phase synchronous transformation is made, consistent with the equations provided in the figure.

Figure 5:
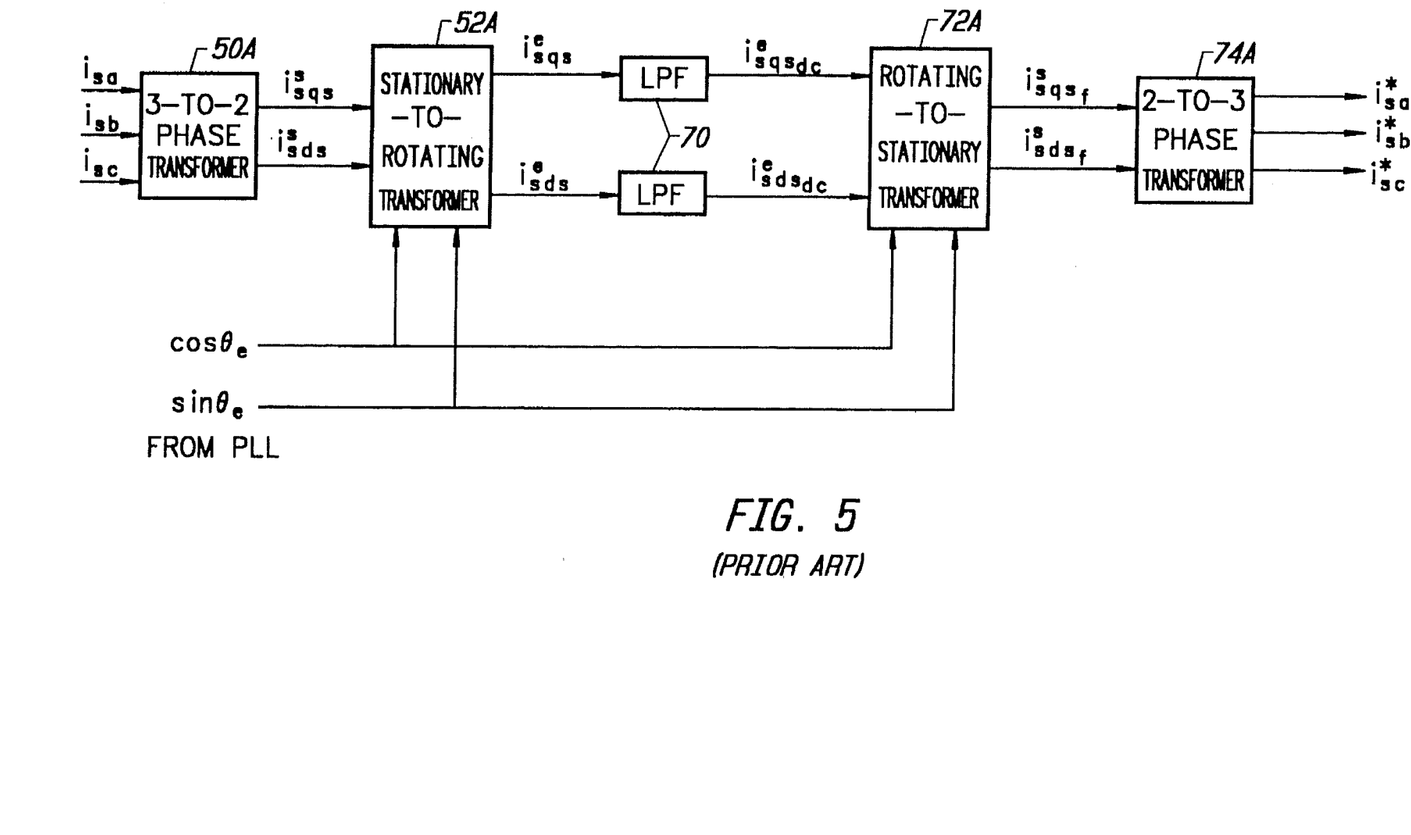
FIG. 5 illustrates a field orientation control system which may be employed in conjunction with the system of FIG. 1.

FIG. 5 shows a control scheme specifically directed to the series active filter of FIG. 1. The three-phase source currents, $i_{sa}$, $i_{sb}$, $i_{sc}$ are measured and transformed from three-phase to two-phase stationary reference frame ds - qs quantities using a 3-to-2 phase transformer 50A. The 3-to-2 phase transformer executes the following equation:

$$\begin{bmatrix} i^s_{sqs} \\ i^s_{sds} \end{bmatrix} = \sqrt{2/3} \begin{bmatrix} 1 & -1/2 & -1/2 \\ 0 & -\sqrt{3}/2 & \sqrt{3}/2 \end{bmatrix} \begin{bmatrix} i_{sa} \\ i_{sb} \\ i_{sc} \end{bmatrix}$$

The stationary reference frame ds - qs source currents from the 3-to-2 phase transformer 50A are then transformed to a synchronous rotating de-qe reference frame by a stationary-to-rotating transformer 52A which executes the following equation:

$$\begin{bmatrix} i^e_{sqs} \\ i^e_{sds} \end{bmatrix} = \begin{bmatrix} \cos\theta & -\sin\theta \\ \sin\theta & \cos\theta \end{bmatrix} \begin{bmatrix} I^s_{qs} \\ I^s_{ds} \end{bmatrix}$$

Figure 6:
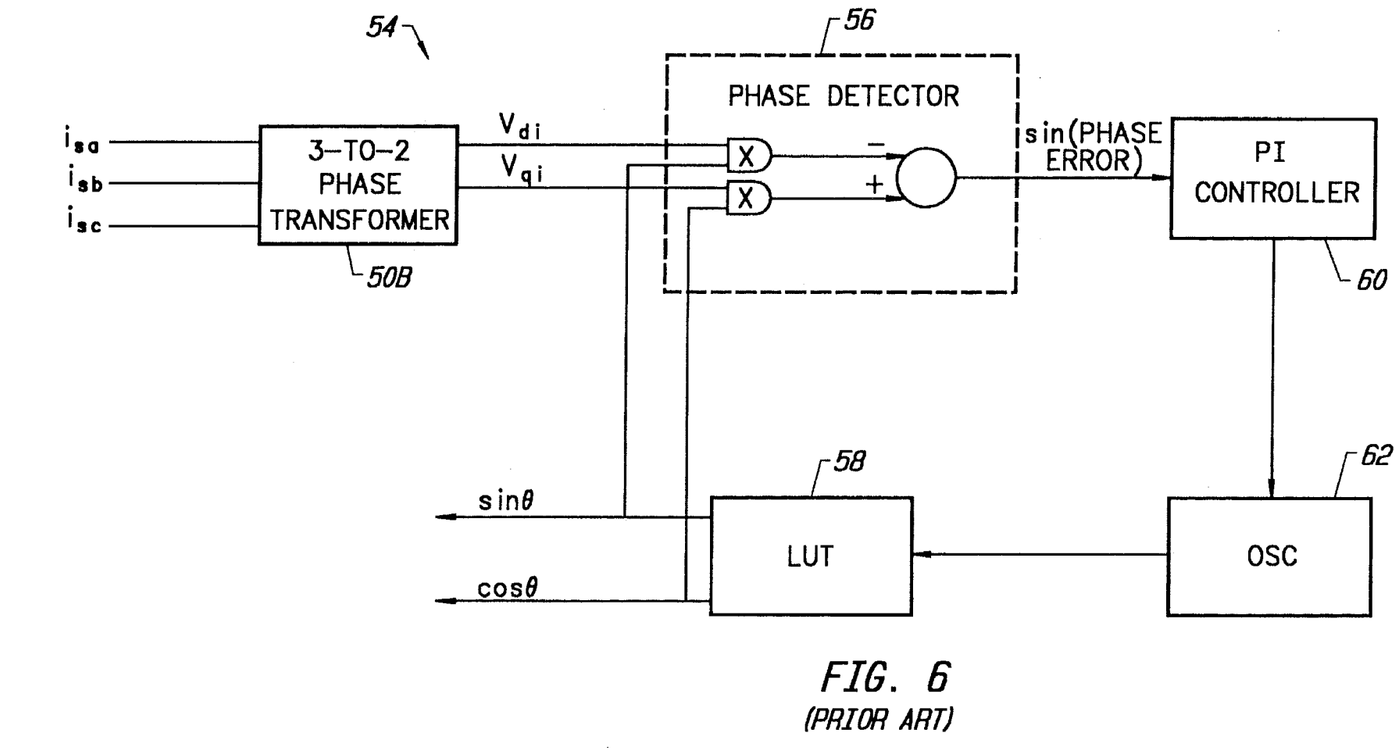
FIG. 6 depicts a phase-locked loop which may be used in conjunction with the field orientation control system of FIG. 5.

The unit vectors cos Θ and sin Θ are obtained from a phase-locked loop 54 which is illustrated in FIG. 6. The phase-locked loop 54 obtains an instantaneous vector sum of the three-phase input voltages ($V_{ia}$, $V_{ib}$, $V_{ic}$) by using a 3-to-2 phase transformer 50B that generates signals $V_{di}$ and $V_{qi}$. These signals are conveyed to a phase detector 56. The phase detector output may be defined as:

$$\sin(\text{phase error}) = vdi*\cos\Theta - vqi*\sin\Theta$$

In the equation, sin Θ and cos Θ are the values presently pointed to in a look-up table 58.

The phase detector 56 output is processed by a proportional plus integral (PI) controller 60 which provides fast response and zero steady-state tracking error. The PI controller 60 output is used to determine the count parameter of a timer or digital oscillator 62. The timer count value is decremented from the count parameter value at a constant rate, when zero is reached the sin Θ and cos Θ pointers in the look-up table 58 are incremented. Since this is a closed-loop system, the timer count value is either increased or decreased, depending on the PI controller 60 output, so as to reduce the phase error until a phase-locked condition is achieved. Naturally, a hardware implementation of the phase-locked loop may also be used.

Returning to FIG. 5, in the synchronously rotating de-qe reference frame at synchronous frequency Θ, the components of signals $I^e_{sqs}$ and $I^e_{sds}$ at the fundamental frequency Θ, are transformed to dc quantities and all the harmonics are transformed to non-dc quantities and undergo a frequency shift in the spectrum. Low-pass filters 70 are used to yield dc signals, $I^e_{sqsdc}$ and $I^e_{sdsdc}$m, in the synchronous reference frame. The dc signals correspond to the fundamental component of the source current. A rotating-to-stationary transformer 72A is used to transform the signals from the synchronous reference frame to a stationary reference frame. In particular, the rotating-to-stationary transformer 72A executes the following equation:

$$\begin{bmatrix} i^s_{sqs_f} \\ i^s_{sds_f} \end{bmatrix} = \begin{bmatrix} \cos\theta & \sin\theta \\ -\sin\theta & \cos\theta \end{bmatrix} \begin{bmatrix} I^e_{sqs_{dc}} \\ I^e_{sds_{dc}} \end{bmatrix}$$

The stationary reference frame output signals, $I^s_{sqs_f}$ and $I^s_{sds_f}$, are transformed to a three-phase signal with a 2-to-3 phase transformer 74A that executes the $$\begin{bmatrix} i_{sa}* \\ i_{sb}* \\ i_{sc}* \end{bmatrix} = \sqrt{2/3} \begin{bmatrix} 1 & 0 \\ -1/2 & -\sqrt{3}/2 \\ -1/2 & \sqrt{3}/2 \end{bmatrix} \begin{bmatrix} i^s_{qs_f} \\ i^s_{ds_f} \end{bmatrix}$$

The 2-to-3 phase transformer 74A yields three-phase reference source currents $I*_{sa}$, $i*_{sb}$, and $i*_{sc}$. The reference currents are then applied to the series filter 34 by means of an appropriate modulator as known by those skilled in the art. The series active filter is in series with the supply, the current reference signals are derived from the supply currents. It is desired that the supply current be sinusoidal fundamental current and therefore the most effective controller implementation is based on the derivation of the current reference signals from the supply currents. An alternative implementation would be to reconstruct the desired supply current reference signals form the load and the passive filter currents.

Since any non-dc components in the synchronous reference frame are attributed to harmonics in the three-phase reference frame, low-pass filtering of the synchronous reference frame signal yields the fundamental source current in the three-phase reference frame.

While this approach seems highly desirable, there are still a number of problems associated with it. One problem is the requirement that the series inverter be protected and isolated from unbalanced supply currents and unbalanced voltages. As previously indicated, a typical series inverter of a hybrid series active, parallel passive power line conditioner will be rated 2–5% of the total load VA rating. Therefore, the series inverter is only rated to absorb a small amount of fundamental frequency voltage and current or fundamental VA. The aim is to limit the fundamental VA to only the magnetizing component of the series coupling transformer and the small amount of real power required to provide for the DC bus voltage control (i.e., to supply the switching and conduction losses of the inverter). If the rating of the series inverter is increased to supply or absorb fundamental VA, a non-competitive commercial device results. Therefore, it is highly desirable to provide a mechanism to isolate the series inverter from unbalanced supply currents and unbalanced voltages across the series active filter.

Extracting the unbalanced currents that damage a series inverter is difficult. The negative sequence fundamental frequency ($\omega$) component due to unbalance in the supply current results in a double fundamental frequency component ($2\omega$) when transformed into the positive sequence fundamental frequency $d^e$–$q^e$ reference frame rotating at synchronous fundamental frequency $\omega$. This part of the actual fundamental frequency component is tantamount to a second harmonic (120 Hz in a 60 Hz system) in the positive sequence fundamental frequency synchronously rotating $d^e$–$q^e$ reference frame. As a result, it is extracted by the low pass filter 70. Consequently, the negative sequence fundamental frequency component current requires the series active filter to generate fundamental frequency voltage. This fundamental frequency voltage generated by the inverter will be unbalanced. This results in large ripple (120 Hz or second harmonic) current in the dc bus capacitor and hence requires larger ripple current rating of the dc bus capacitors (or dc side inductors in case of a dc current link). This implies that the series active filter must supply or absorb fundamental VA since it generates fundamental frequency voltage and carries fundamental frequency supply current. The amount of fundamental VA supplied or absorbed by the series active filter depends on the percentage of the unbalance in the supply current, which generates the corresponding fundamental frequency voltage. The amount of fundamental VA supplied or absorbed under such conditions (i.e. if the series active filter is not isolated) also depends on the fundamental frequency supply current which is dependent on the load and the passive filter fundamental frequency reactive compensation.

As previously indicated, since the rating of the active series filter is very small (2–5%) compared to the load VA rating, even a small percentage of the load fundamental VA supplied or absorbed by the series active filter may exceed the inverter rating capability. This saturates the inverter current controller and the inverter is not able to provide harmonic isolation between the load and the supply.

OBJECTS AND SUMMARY OF THE INVENTION

It is a general object of the present invention to provide a hybrid series active, parallel passive, power line conditioner for unbalanced load, passive filter and source conditions.

It is a more particular object of the invention to provide a hybrid series active, parallel passive, power line conditioner that detects supply current unbalance.

It is a related object of the invention to provide a hybrid series active, parallel passive, power line conditioner that isolates itself from line voltage and supply current unbalance.

It is another object of the invention to provide a hybrid series active, parallel passive, power line conditioner wherein the series filter has a low VA rating under all combination of unbalanced conditions.

It is another object of the invention to provide a serial inverter that reduces passive filter terminal distortion.

It is another object of the invention to provide a hybrid series active, parallel passive, power line conditioner that may be physically positioned in a number of convenient locations.

It is another object of the invention to provide a series active filter that acts as a harmonic isolator between the supply and load, while decoupling the supply and the load at each harmonic frequency.

These and other objects are achieved by a power line conditioner operated in a method according to the present invention. The apparatus includes an active filter, coupled in series, and a passive filter, coupled in parallel, to a power distribution network. The power distribution network includes a voltage source that induces input currents at a first end of the power distribution network. Nonlinear loads and other conditions on the power distribution network cause unbalanced power signals. The active filter controller of the invention uses synchronous transformations on the input currents to identify a negative sequence fundamental signal and a positive sequence fundamental signal, while filtering all harmonic components within the input currents. The negative sequence fundamental signal and the positive sequence fundamental signal are combined to form an active filter reference signal which is applied to the active filter. In response to the active filter reference signal, the active filter operates as a current controlled harmonic voltage source, carrying only the fundamental current, while only injecting harmonic voltages. Consequently, the active filter is operated as a harmonic isolator between the supply and load. In other words, the active filter decouples the supply and the load at each harmonic frequency. Since the active filter does not inject fundamental frequency voltage, the active filter does not supply or absorb any fundamental VA. Consequently, the active filter has a commercially attractive small VA rating compared to the load VA rating and compared to other active filter schemes.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 7:
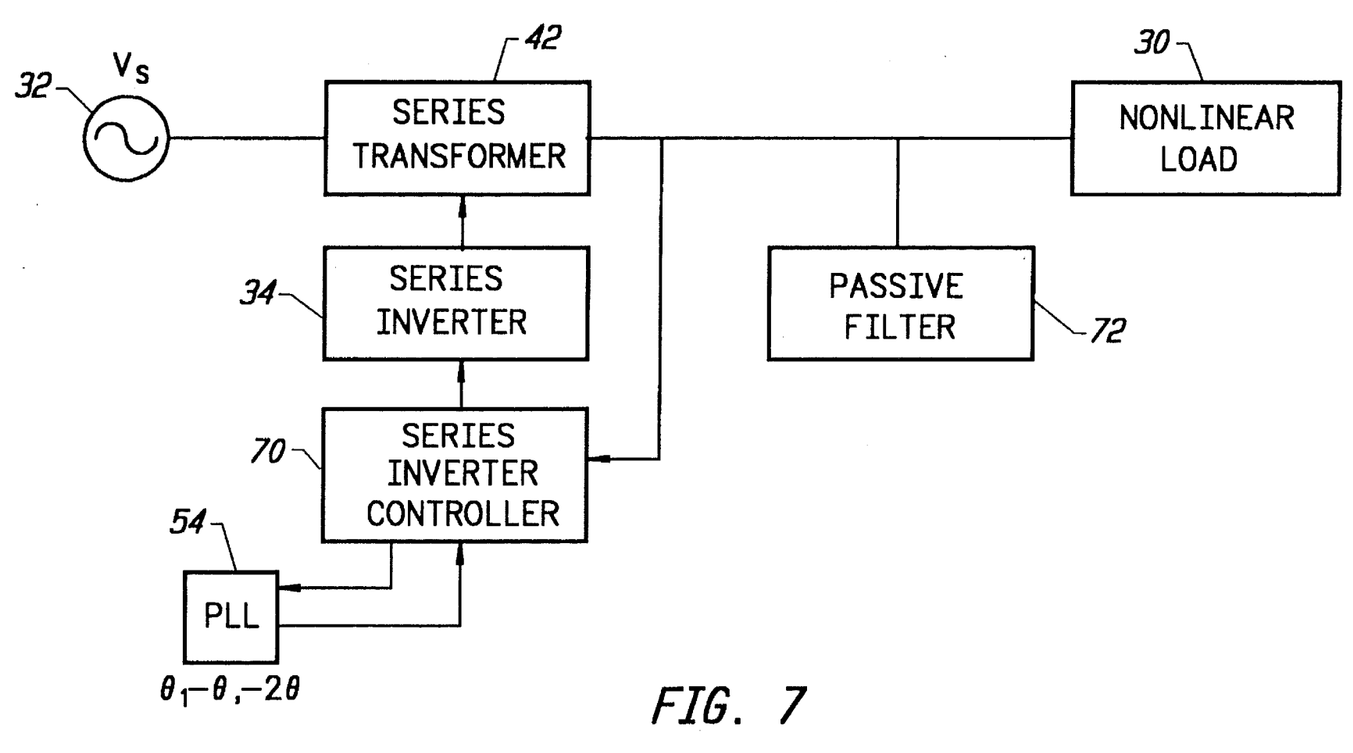
FIG. 7 depicts the hybrid active-passive power line conditioner of the present invention.

FIG. 7 depicts elements associated with the present invention. In general, the invention is directed to an inverter controller 70 that is used in conjunction with other known elements. The invention is disclosed in reference to a series inverter, but it should be appreciated that the techniques of the invention are equally applicable to other active filter topologies, such as parallel active filters.

FIG. 7 illustrates that the series inverter controller 70 of the invention is used to control a series inverter 34 (such as a resonant dc link inverter) which is coupled to a series transformer 42 positioned between a voltage supply 32 and a nonlinear load 30. A phase-locked loop 54 is coupled to the series inverter controller 70 and a passive filter 72 is provided. The series transformer 42, series inverter 34, and passive filter 72 may be of the type disclosed in relation to FIG. 1. The phase-locked loop 54 may be of the type described in relation to FIG. 6.

The series inverter controller 70 of the invention departs from prior art controllers, such as the one described in FIG. 5, in that it is designed to identify line voltage and supply current unbalance. More particularly, the series inverter controller 70 identifies and combines the positive sequence fundamental signal and the negative sequence fundamental signal in the supply current to form a series inverter reference signal that is applied to the series inverter 34. The series inverter reference signal forces the series inverter 34 to only carry the total fundamental frequency supply current, i.e. both positive and negative sequence supply currents. Since the series active filter reference current comprises both the positive and negative sequence fundamental supply current, the series active filter is isolated from the unbalanced source, passive filter and load conditions. Therefore, the supply and load are coupled only at the fundamental frequency. Consequently, the series active filter injects harmonic voltages, but no fundamental voltage. Since no fundamental voltage is injected by the active filter, the active filter does not supply or absorb any fundamental VA. As a result, the active filter may have a commercially attractive small VA rating. The injected load current harmonic components are absorbed by the passive filter 72.

Figure 8:
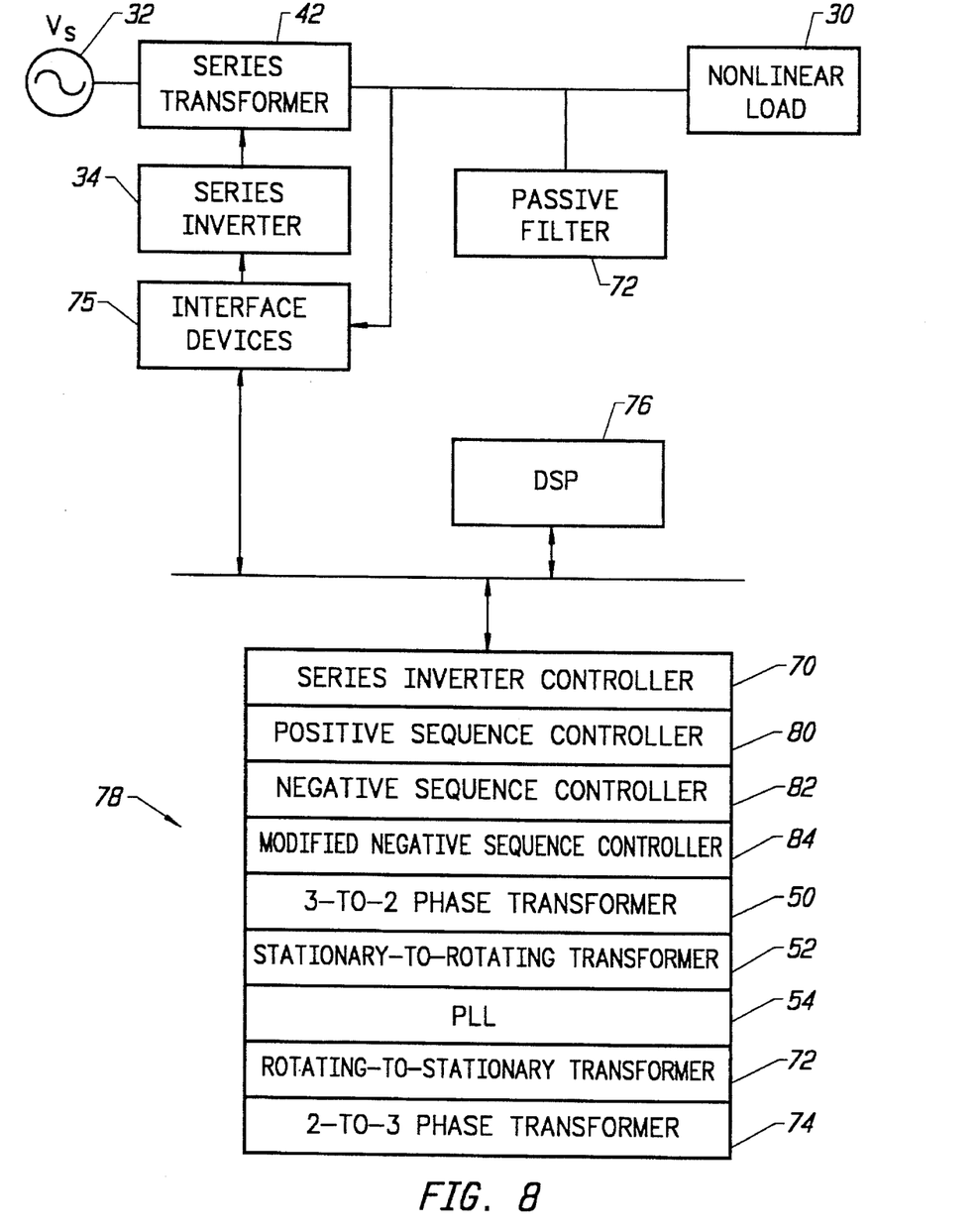
FIG. 8 depicts the analog and digital components associated with a preferred embodiment of the present invention.

The invention is more fully described in relation to FIG. 8. FIG. 8 is a block diagram generally corresponding to FIG. 7, but separately depicting the hardware and computer controlled elements of one embodiment of the invention. In this embodiment of the invention, a digital signal processor 76 is used in conjunction with a memory unit 78 to execute a number of control programs. The memory unit 78 may be RAM, ROM, disc storage, or any suitable combination of memory elements. The apparatus also includes interface devices 75 for providing analog/digital and digital/analog conversions between the digital signal processor 76 and the remaining analog elements. The interactions between a digital signal processor 76, a memory unit 78, and interface devices 75 is known in the art.

The control programs stored in memory 78 include the series inverter controller 70, which specifically includes a positive sequence controller 80, a negative sequence controller 82, and a modified negative sequence controller 84. The control programs also include a 3-to-2 phase transformer 50, a stationary- to-rotating transformer 52, a phase-locked loop 54, a rotating-to-stationary transformer 72, and a 2-to-3 phase transformer 74, all of the type previously described.

The series inverter controller 70 generates a set of signals, which are applied through interface devices 75, that isolate the series inverter 34 from unbalanced load, passive filter and source conditions. As described above, the series inverter controller 90 identifies the positive and negative sequence fundamental components from the series inverter supply signal. Note that in any system which does not have zero sequence component (as in a 3-wire system case), the positive and negative sequence components completely define the signal. Hence, this method achieves complete extraction of the fundamental supply current.

Figure 9:
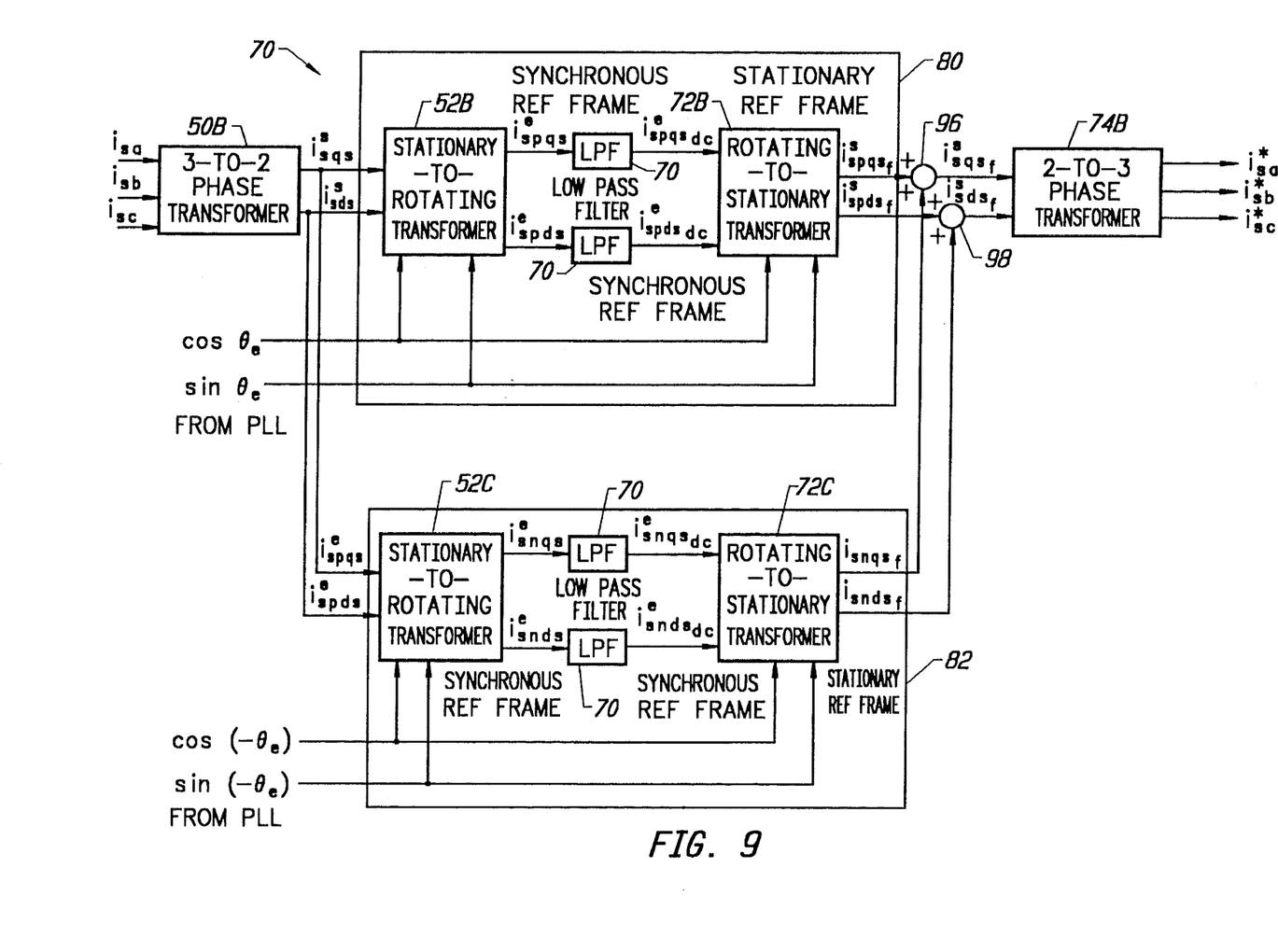
FIG. 9 is a detailed representation of the series inverter controller associated with the power line conditioner of the present invention.

FIG. 9 is a detailed representation of the series inverter controller 70 of the invention. By way of overview, the series inverter controller 70 utilizes synchronous transformations upon a set of supply input current signals to generate series inverter reference signals that will force the series inverter 34 to be isolated from the unbalanced load, passive filter and source conditions. More particularly, synchronous transformations are utilized to identify a positive sequence fundamental signal and a negative sequence fundamental signal. The identified signals are then combined to yield a series inverter reference signal ($i^*_{sa}$, $i^*_{sb}$, $i^*_{sc}$).

Having provided an overview of the processing associated with the series inverter controller 70 of the invention, attention presently turns to a more detailed consideration of the operation of the controller 70. Elements 50B, 52B, 70, 72B, and 74B of the controller 70 operate in accordance with the controller described in relation to FIG. 5.

The series inverter reference signal processing is accomplished by processing the three-phase supply current signal sampled between the series transformer 42 and the passive filter 72, as shown in FIGS. 7 and 8. Note that signals are not required from the load or the passive filter system. Thus, the apparatus of the invention may be conveniently positioned at any number of practical locations.

The supply current can be measured on the secondary (inverter) side of the series coupling transformer 42. The advantage is that the secondary side of the series coupling transformer has lower current levels (due to the large turns ratio of the series coupling transformer, which is usually 1:20, 20 being on the secondary side) and hence requires lower rating and lower cost current sensors and the measurement is local to the series active filter 34.

Instead of sampling each current phase, two of the current phases may be sampled and used to derive the third phase. For instance, the following equation may be used $I_{sb} = -(I_{sa} + I_{sc})$. This can be done for a 3 wire system since Ia+Ib+Ic+0.

A 3-to-2 phase transformer 50B is used to yield two-phase stationary reference frame ds–qs quantities which are conveyed to a positive sequence controller 80 and a negative sequence controller 82. In the positive sequence controller 80, a stationary-to-rotating transformer 52B is used to produce corresponding two-phase rotating reference frame ds-qs quantities. Stationary-to-rotating transformer 52B receives phase values from the phase-locked loop 54 that correspond to the fundamental component of the load current (n=1, Θ), therefore it yields adc component corresponding to the fundamental component of the load current. Known low-pass filters 70 are used to extract the dc component and filter all high frequency components corresponding to harmonics in the load current signal. A simple first order low pass filter or a second order low pass filter with a cut-off frequency of 5 Hz may be used.

In the negative sequence controller 82, stationary-to-rotating transformer 52C receives phase values from the phase-locked loop 54 that correspond to the negative sequence fundamental (n=1, −Θ). In other words, the phase-locked loop of FIG. 6 has a look-up table 58 filled with −Θ values.

The stationary-to-rotating transformer 52D yields dc component signals corresponding to the negative sequence fundamental. Low pass filters 70 are used to extract the dc signals. Since the filtered signals are dc quantities, there is no phase error introduced by the low-pass filters 70 for either the balanced positive sequence or the balanced negative sequence fundamental frequency component of the supply current.

Rotating-to-stationary transformers (72B, 72C) are used to transform the dc signals from the low pass filters to two-phase stationary reference frame ds–qs quantities. In particular, rotating-to-stationary transformer 72B generates two-phase fundamental current reference signals, $I^s_{spqsf}$ and $I^s_{spdsf}$, corresponding to the fundamental component of the supply current. Rotating-to-stationary transformer 72C generates two-phase fundamental current reference signals $I^s_{snqsf}$ and $I^s_{sndsf}$, corresponding to the negative sequence fundamental component of the supply current.

Mixer 96 is used to add the "q" component of the negative sequence fundamental supply current to the "q" component of the positive sequence fundamental supply current. This operation results in a "q" component intermediate series inverter reference signal. Similarly, mixer 98 is used to add the "d" component of the negative sequence fundamental supply current to the "d" component of the positive sequence fundamental supply current. This operation results in a "d" component intermediate series inverter reference signal.

The "q" and "d" component intermediate series inverter reference signals are transformed by 2-to-3 phase transformer 74B to a three-phase series inverter reference signal ($i^*_{sa}$, $I^*_{sb}$, $i^*_{sc}$). The series inverter reference signal is converted by interface devices 75 into appropriate drive signals to be executed by the series inverter 34. The harmonic voltage output of the series inverter 34 is relayed to the series transformer 42.

Figure 10:
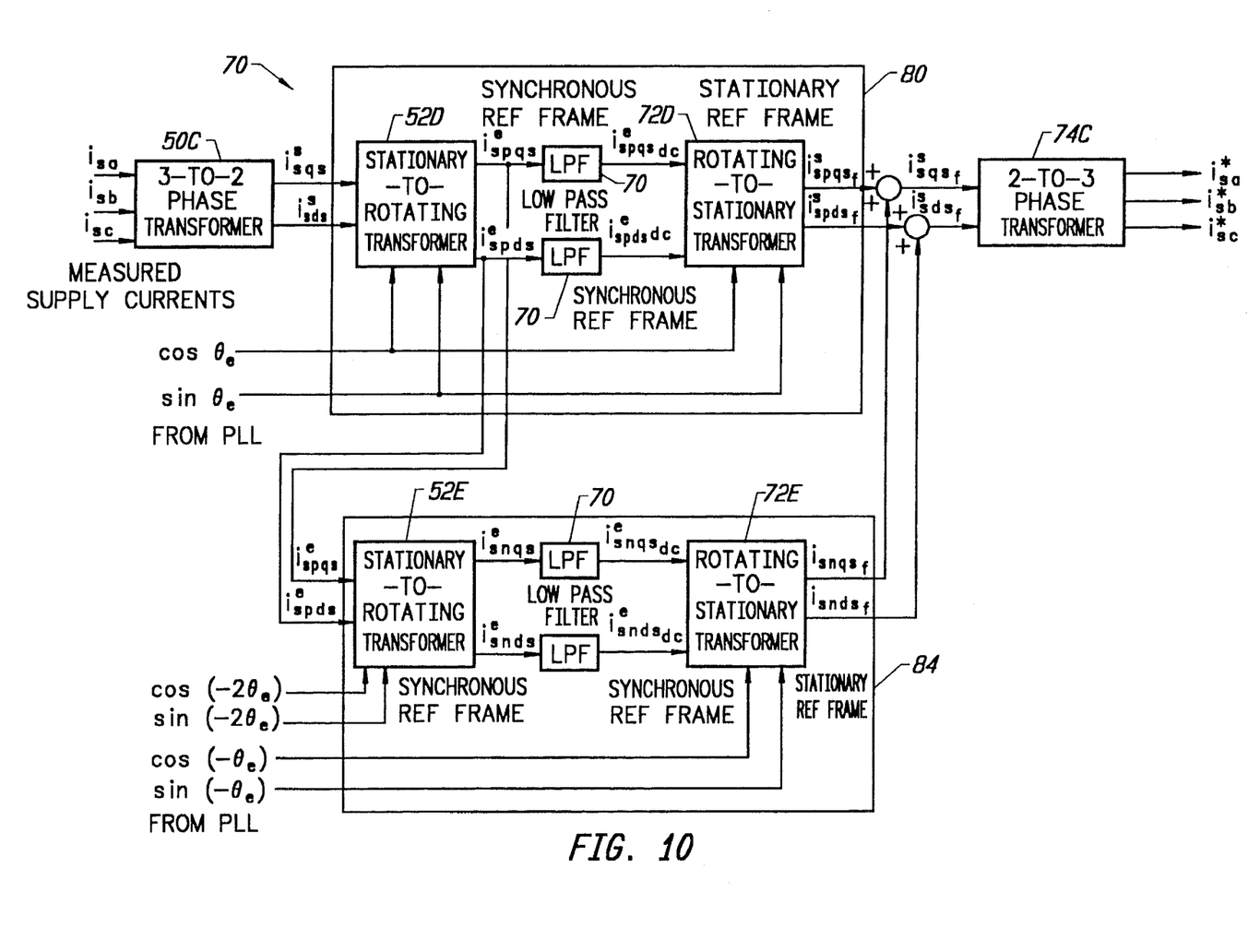
FIG. 10 is an alternate embodiment of a series inverter controller that may be used in accordance with the present invention.

An alternate embodiment of the series inverter controller 70 of the invention is depicted in relation to FIG. 10. The modified negative sequence controller 84 is identical to the negative sequence controller 82 except that the values received from the phase-locked loop 54 and applied to the stationary-to-rotating transformer 52E are set at−2Θ. The−2Θ values may be obtained through appropriate modification of the look-up table 58 of phase-locked loop 54.

The transformation by twice the negative fundamental frequency (−2Θ) ensures that the balanced negative sequence components at the fundamental frequency are transformed to dc quantities. Doubling the negative sequence component value is desirable because in the synchronously positively rotating reference frame at synchronous frequency e, the balanced negative sequence components are transformed to twice the fundamental frequency 2ω, and all the harmonics are transformed to non-dc quantities.

The drawback associated with the modified negative sequence controller 84 is that an additional look-up table 58 is required for the phase-locked loop 54. That is, an additional look-up table for the −2ω values is required.

In lieu of synchronous transformations, instantaneous reactive power theory may be used to implement the controller of the invention. In the alternative, high-pass filters may be used to achieve the same result. The high-pass filter transfer function may be implemented by a summation of unity gain and Butterworth low-pass filter transfer functions.

Thus, a hybrid series active, parallel passive, power line conditioner for unbalanced load and source conditions has been described. The active power line conditioner of the invention is highly advantageous because it isolates itself from line voltage and supply current unbalance. As a result, the series active filter can be constructed as a low VA rating device that is commercially practical. Another advantage associated with the invention is that it only relies upon the measurement of the supply current. Thus, measurements from the load or passive filter system are not required. This allows the conditioner to be conveniently positioned. For instance, the series active filter may be placed directly on the low voltage side of a customer transformer. The series active filter can be used for multiple loads in industrial environments.

The foregoing descriptions of specific embodiments of the present invention are presented for purposes of illustration and description. They are not intended to be exhaustive or to limit the invention to the precise forms disclosed, obviously many modifications and variations are possible in view of the above teachings. For example, it should be appreciated that the controller of the invention may be a hardwired device, an ASIC, etc. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. A power line conditioner, comprising:

an active filter connected to a power distribution network, said power distribution network including a voltage source and a load, said voltage source inducing unbalanced supply currents in said power distribution network; and an active filter controller coupled to said active filter and said power distribution network, said active filter controller including means for identifying a negative sequence fundamental component signal and a positive sequence fundamental component signal in said unbalanced supply currents, means for adding said negative sequence fundamental component signal and said positive sequence fundamental component signal to form an active filter reference signal, and means for applying said active filter reference signal to said active filter, causing said active filter to operate as a harmonic isolator between said voltage source and said load.

2. The power line conditioner of claim 1 wherein said active filter controller performs synchronous transformations to identify said negative sequence fundamental signal and said positive sequence fundamental signal.

3. A power line conditioner, comprising:

an active filter connected in series to a power distribution network, said power distribution network including a voltage source and a load, said voltage source inducing unbalanced supply currents in said power distribution network;

a passive filter coupled, in parallel, to said power distribution network; and an active filter controller coupled to said active filter and said power distribution network, said active filter controller including means for identifying a negative sequence fundamental component signal and a positive sequence fundamental component signal in said unbalanced supply currents, means for adding said negative sequence fundamental component signal and said positive sequence fundamental component signal to form an active filter reference signal, and means for applying said active filter reference signal to said active filter, causing said active filter to operate as a harmonic isolator between said voltage source and said load.

4. The power line conditioner of claim 3 wherein said active filter controller performs synchronous transformations to identify said negative sequence fundamental signal and said positive sequence fundamental signal.

5. A method of operating a power line conditioner of the type including an active filter connected to a power distribution network, and an active filter controller connected to said active filter and said power distribution network, said power distribution network including a voltage source inducing an input current at a first end of said power distribution network and a load at a second end of said power distribution network, said input current having unbalanced components, said method comprising the steps of:

identifying a positive sequence fundamental signal within said input current;

distinguishing a negative sequence fundamental signal within said input current;

combining said positive sequence fundamental signal and said negative sequence fundamental signal to form an inverter reference signal; and applying said inverter reference signal to said active filter to harmonically isolate said active filter from said voltage source.

6. The method of claim 5 wherein said identifying step and said distinguishing step are performed by utilizing synchronous transformations of said input current.

7. The method of claim 6 wherein said identifying step, said distinguishing step, said combining step, and said applying step are performed by said active filter controller.

* * * * *